(12) United States Patent
Watanabe et al.

(10) Patent No.: US 6,504,632 B1
(45) Date of Patent: Jan. 7, 2003

(54) OPTICAL TRANSMITTER AND RECEIVER MODULE WHICH DEMULTIPLEXES A SUPERIMPOSED OPTICAL SIGNAL

(75) Inventors: Yoshiaki Watanabe, Tsurugashima (JP); Kiyoshi Takei, Tsurugashima (JP); Nong Chen, Tsurugashima (JP); Kiyofumi Chikuma, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/427,677

(22) Filed: Oct. 27, 1999

(30) Foreign Application Priority Data

Oct. 28, 1998 (JP) .......................................... 10-307353

(51) Int. Cl.$^7$ ........................... H04J 14/02; G02B 6/34; G02B 6/12; G02B 6/26; G02B 6/42
(52) U.S. Cl. ..................... 359/130; 359/124; 359/127; 385/37; 385/14; 385/31; 385/39
(58) Field of Search ................................. 359/115, 124, 359/127, 130; 385/14, 24, 31, 37, 39, 42

(56) References Cited

U.S. PATENT DOCUMENTS 5,479,547 A * 12/1995 Kunikane et al. ............. 385/47
5,748,815 A * 5/1998 Hamel et al. .................. 385/37
5,777,763 A * 7/1998 Tomlinson, III ............ 359/130
6,330,090 B1 * 12/2001 Martin et al. ................ 359/131

FOREIGN PATENT DOCUMENTS

JP 8-190026 7/1996

* cited by examiner

Primary Examiner—Jason Chan
Assistant Examiner—M. R. Sedighian
(74) Attorney, Agent, or Firm—Morgan, Lewis & Bockius LLP

(57) ABSTRACT

An optical transmitter and receiver module de-multiplexes a superimposed optical signal into which at least a first and second wavelength band are superimposed, and receives and transmits an optical signal of the first wavelength band. The module includes an input/output wave-guide having an outer end portion and inner end portion for inputting superimposed optical signals, a receiver portion for receiving optical signals of the first wavelength band, an output wave-guide having an outer end portion and inner end portion for outputting optical signals of the second wavelength band, and a transmitter portion for transmitting the optical signals of the first wavelength band.

3 Claims, 3 Drawing Sheets

NORMAL OF DIFFRACTION GRATING SURFACE

OPTICAL TRANSMITTER AND RECEIVER MODULE WHICH DEMULTIPLEXES A SUPERIMPOSED OPTICAL SIGNAL

BACKGROUND OF THE INVENTION

1. Field of the Invention

The present invention relates to an optical transmitter and receiver module, and particular to an integrated optical transmitter/receiver module.

2. Description of the Related Art

Recently, image information communications have been increasingly more common and attempts to adopt optical cables for communications have been made. Among these attempts, the access system optical communication adopts light waves of a wavelength band centered around 1.39 $\mu$m for bidirectional communications between a plurality of subscribers and transmitter stations and at the same time, light waves of a wavelength band centered around 1.55 $\mu$m for distributing image information from a transmitter station to the subscribers. In this type of system, it is necessary to install a WDM (Wavelength Division Multiplexing) optical transmitter and receiver module on the subscribers side of the system.

In the optical transmitter and receiver module, a type of module that employs a dielectric multilayer filter, that is, a reflective wavelength de-multiplexer, has received attention since the module realizes isolation over a broad bandwidth (Japanese patent application kokai 8-190026). As shown in FIG. 1, in a prior art optical transmitter and receiver module, single mode wave-guides 2, 3, and 2' each having a core contained in a cladding 12 made of quartz-based glass are formed on a silicon substrate 11. Near a position of intersection of wave-guides 2 and 3, there is disposed a groove 4 formed with a dicing saw and a dielectric multilayer filter 5 is disposed therein. The optical axis of the wave-guide 2' formed opposite to the wave-guides 2 and 3 of the dielectric multilayer filter 5 is in alignment with the optical axis of the wave-guide 2.

In a planar light-wave circuit 30, an input/output single mode optical fiber 10A and an output single mode optical fiber 10B are fixedly inserted into a glass block 9. The glass block 9 is fixedly bonded to the end face of the circuit so that the optical axes of the input/output and output single mode optical fibers 10A and 10B are in alignment with the optical axes of the wave-guides 2 and 3 respectively. Wavelength-multiplexed beams of light of wavelength bands centered around 1.3 $\mu$m and 1.55 $\mu$m are launched from the input/output port into the wave-guide 2. The light beam of a wavelength band centered around 1.55 $\mu$m is reflected at the dielectric multilayer filter 5 to be guided into the wave-guide 3 and then is coupled into the output single mode optical fiber 10B at the end of the wave-guide to be outputted. On the other hand, the light beam of a wavelength band centered around 1.3 $\mu$m from the wave-guide 2 passes through the dielectric multilayer filter 5, i.e., the reflective wavelength multiplexer/de-multiplexer, and enters the wave-guide 2'. The wave-guide 2' is divided into two at a Y branch 6 in which one of branching wave-guide is connected to a laser diode 7 and the other is a photo-diode 8. The laser diode 7 is used for transmitting signals generated from one receiver of the subscribers to the input/output single mode optical fiber 10A, whereas the photo-diode 8 is used for converting the received optical signals into electric signals. Beams of light of a wavelength band centered around 1.55 $\mu$m are used, for example, for distributing multi-channel video signals from a transmitter station to the subscribers, while beams of light of a wavelength band centered around 1.3 $\mu$m are used in bidirectional communications for transmitting various kinds of data signals.

As mentioned above, the optical transmitter and receiver module is a filter reflective WDM module that employs the PLC (Planer Light-wave Circuit) hybrid integration technique having the functions of transmitting and receiving light waves of 1.55 $\mu$m and of receiving 1.3 $\mu$m, and of multiplexing and de-multiplexing those waves, with the compatibility of low cost and practical service durability.

In the foregoing, there are projections and depressions on the side face of a groove 4 dug and formed with a dicing saw, and thus it is difficult to grind the groove side faces. Accordingly, groove formation and filter insertion require high accuracy in the construction of this optical transmitter and receiver module. Thus, with this optical transmitter and receiver module, two-wave multiplexing of 1.55 $\mu$m and 1.31 $\mu$m can be managed, however, the module cannot be employed for communications of higher multiplicity from the point of view of filter resolution and loss thereof. In addition, the transmitter laser diode is vulnerable to the return light, so that there is a fear of an adverse effect thereof. Moreover, a dielectric multilayer filter 5 is formed by alternately depositing plural layers of $SiO_2$ and $TiO_2$ on a polyimide film of a predetermined thickness so that the dielectric multilayer filter 5 transmits light waves of a wavelength band centered around 1.3 $\mu$m and reflects a wavelength band centered around 1.55 $\mu$m. In addition, the film of this dielectric multilayer filter is inserted into the groove and fixed with a silicone adhesive 13 and is subject to deterioration with age. Furthermore, there is a problem in that the projections and depressions of the side face of the groove, the adhesive agent, and the plastic film cause the beams of light passing therethrough a great deal of loss in the reflection and transmission.

OBJECT AND SUMMARY OF THE INVENTION

In view of the foregoing, the present invention has been made in view of the problem mentioned above, and the object of the present invention is to provide an optical transmitter and receiver module with less optical loss.

The optical transmitter and receiver module according to the present invention is an optical transmitter and receiver module which de-multiplexes a superimposed optical signal into which at least a first and second wavelength band are superimposed, and receives and transmits an optical signal of the first wavelength band, said optical transmitter and receiver module comprising an input/output wave-guide having an outer end portion and inner end portion for inputting superimposed optical signals, a receiver portion for receiving optical signals of the first wavelength band, an output wave-guide having an outer end portion and inner end portion for outputting optical signals of the second wavelength band, a transmitter portion for transmitting the optical signals of the first wavelength band, and a dispersing/converging optical system comprising a diffraction grating which de-multiplexes optical signals of the first wavelength band and second wavelength band from said superimposed optical signal launched from the inner end portion of said input/output wave-guide, converges the optical signal of the second wavelength band to the inner end portion of said output wave-guide and converges the optical signal of the first wavelength band to said receiver portion, and also converges the optical signal of the first wavelength band, launched from said transmitter portion to the inner end portion of said input/output wave-guide.

In the optical transmitter and receiver module of the present invention, said diffraction grating is a plane diffraction grating, there are provided collimator lenses on optical paths in front of the inner end portion of said input/output wave-guide in said dispersing/converging optical system, said receiver portion, inner end portion of said output wave-guide and said transmitter portion, the inner end portion of said input/output wave-guide, said receiver portion, the inner end portion of said output wave-guide, and said transmitter portion are disposed respectively, relative to an incidence normal of said plane diffraction grating at a point of incidence on the optical path of said input/output wave-guide, at angular positions which satisfy the following equations:

$$\sin \alpha 0 + \sin \alpha 1 = m\lambda 1/\Lambda$$

$$\sin \alpha 0 + \sin \alpha 2 = m\lambda 2/\Lambda$$

$$\sin \alpha 3 + \sin \alpha 0 = m'\lambda 1/\Lambda$$

$$0 < \alpha 0 < 90$$

$$0 < \alpha 1 < 90$$

$$0 < \alpha 2 < 90$$

$$\alpha 0 \neq \alpha 1 \neq \alpha 2$$

$$-90 < \alpha 3 < 0$$

wherein $\lambda 1$ is a first wavelength band, $\lambda 2$ is a second wavelength band, $\Lambda$ is a lattice constant of the plane diffraction grating, $\alpha$ is an incident angle of the superimposed optical signal from the inner end portion of said input/output wave-guide, $\alpha 1$ is a diffraction angle of the +1-order diffraction light of the optical signal of the first wavelength band to said receiver portion, $\alpha 2$ is a diffraction angle of the +1-order diffraction light of the optical signal of the second wavelength band to the inner end portion of said output wave-guide, $\alpha 3$ is an incident angle of the optical signal of the first wavelength band from said transmitter portion, and m and m' denote diffraction orders of integer with inverse signs having an absolute value.

In the optical transmitter and receiver module of the present invention, said diffraction grating is a depressed diffraction grating, and, in the module there are lying the inner end portion of said input/output wave-guide in said dispersing/converging optical system, said receiver portion, inner end portion of said output wave-guide, and said transmitter portion, on the Rowland having a curvature radius of said depressed diffraction grating as the diameter thereof, respectively.

DETAILED DESCRIPTION OF THE PREFERRED EMBODIMENTS

An optical transmitter and receiver module according to embodiments of the present invention will be described in more detail with reference to the accompanying drawings.

Figure 1:
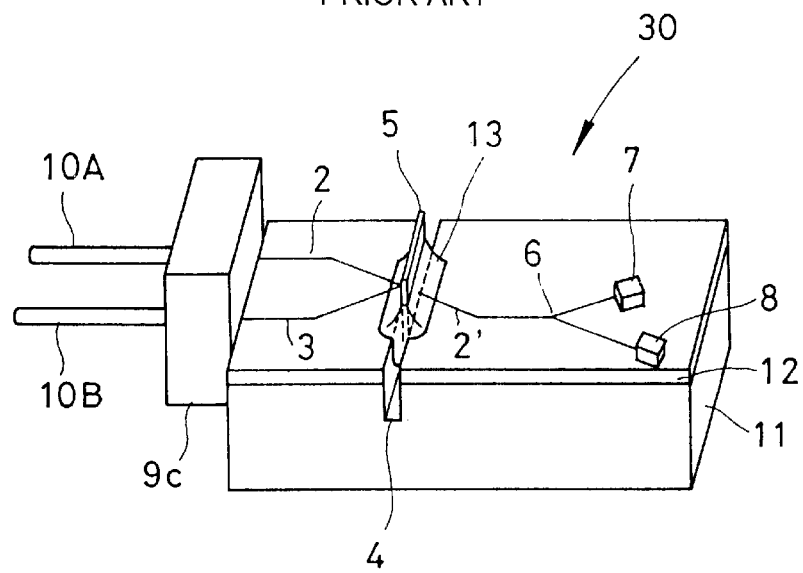
FIG. 1 is a schematic perspective view of a prior art optical transmitter and receiver module.
Figure 2:
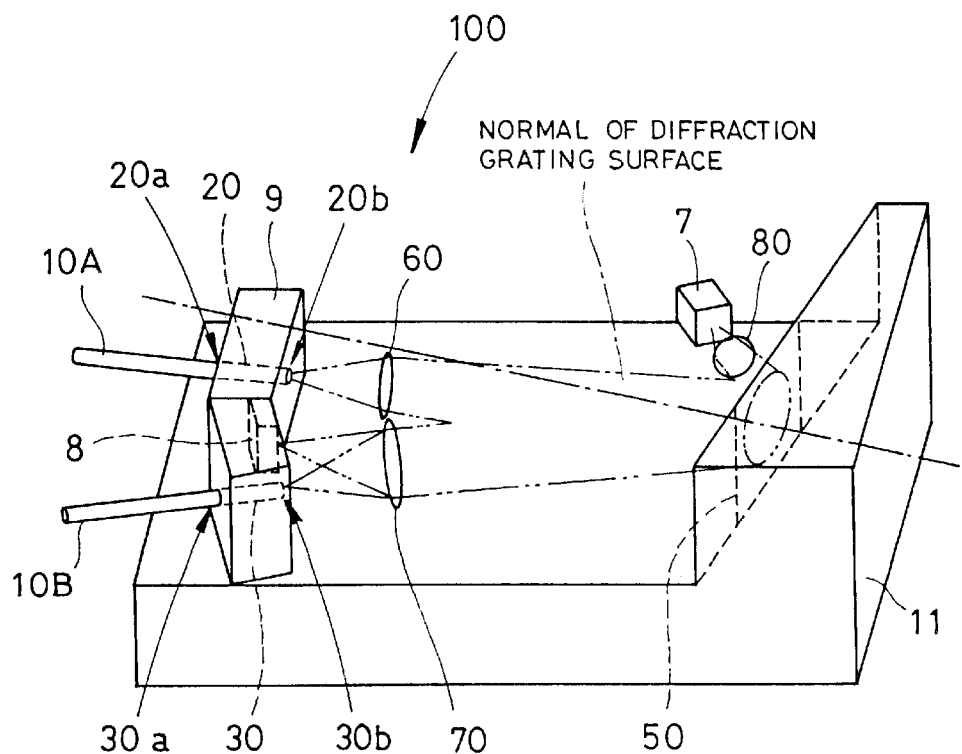
FIG. 2 is a schematic perspective view of an optical transmitter and receiver module of an embodiment of the present invention.

An optical transmitter and receiver module of an embodiment is shown in FIG. 2. This optical transmitter and receiver module 100 comprises an input/output wave-guide 20, that is a common port, having an outer end portion 20a and an inner end portion 20b, secured onto a board 11, respectively, for inputting superimposed optical signals into which a 1.3 $\mu$m signal of a first wavelength band and a 1.55 $\mu$m signal of a second wavelength band are superimposed; a dispersing/converging optical system comprising a reflective plane diffraction grating 50 and condenser lenses 60, 70, and 80; a receiver portion 8 for receiving optical signals of the first wavelength band of 1.3 $\mu$m, and an output wave-guide 30, that is, a 1.55 $\mu$m output port, comprising an outer end portion 30a and inner end portion 30b, for outputting optical signals of the second wavelength band of 1.55 $\mu$m. Moreover, the optical transmitter and receiver module comprises a transmitter portion 7, disposed on a board 11, for transmitting optical signals of the first wavelength band of 1.31 $\mu$m. The optical transmitter and receiver module allows the superimposed optical signal launched from the inner end portion 20b of the input/output wave-guide to be collimated by the condenser lens 60, to enter the diffraction grating 50 at a predetermined incident angle, to undergo a first-order diffraction at the plane diffraction grating 50, to be de-multiplexed into optical signals of 1.31 $\mu$m and 1.55 $\mu$m with high resolution, respectively, and the second wavelength band of 1.55 $\mu$m to converge to the inner end portion 30b of the output port 30 and the first wavelength band of 1.31 $\mu$m to converge on a receiver photo-diode 8 by means of a condenser lens 70.

On the other hand, the transmitter laser diode 7 is disposed on an optical path in a manner such that an optical signal of the first wavelength band of 1.31 $\mu$m launched from the transmitter laser diode 7 is collimated by a condenser lens 80, diffracted at the plane diffraction grating 50, and is incident on the common port 20. At this time, if the optical paths of the launched beams of light from the common port 20 and the transmitter laser diode 7 are disposed so as to locate across the normal of the diffraction grating plane as shown in FIG. 2, no light from the common port 20 enters the transmitter laser diode 7. Ruled diffraction gratings or holographic diffraction gratings would be available for the diffraction grating if they are reflective. Additionally, selecting the direction of blazing may allow a diffraction grating blazed in the direction of diffraction to increase the diffraction intensity to be used. Highly reflective materials such as Al or Au are used as reflective coating considering the wavelength band, etc.

As mentioned above, the optical transmitter and receiver module simply comprising the diffraction grating 50 which is greater than the beam spots of the optical signals of the wavelength bands of 1.31 $\mu$m and 1.55 $\mu$m, and lenses 60, 70, and 80 de-multiplexes superimposed optical signals to output the signals of the second wavelength band of 1.55 $\mu$m to the output port 30 as they are, and receives and transmits the optical signals of the first wavelength band of 1.31 μm at the common port 20. Since the plane diffraction grating 50 is used, de-multiplexing is possible, even if the incident light is wavelength multiplexed, because the direction of the first-order diffraction light is determined for the beam of each of the wavelengths. Since return light is not diffracted by the transmitter laser diode 7, the instability of the transmitter laser diode 7 can be avoided and thus no isolator needs to be provided.

Figure 3:
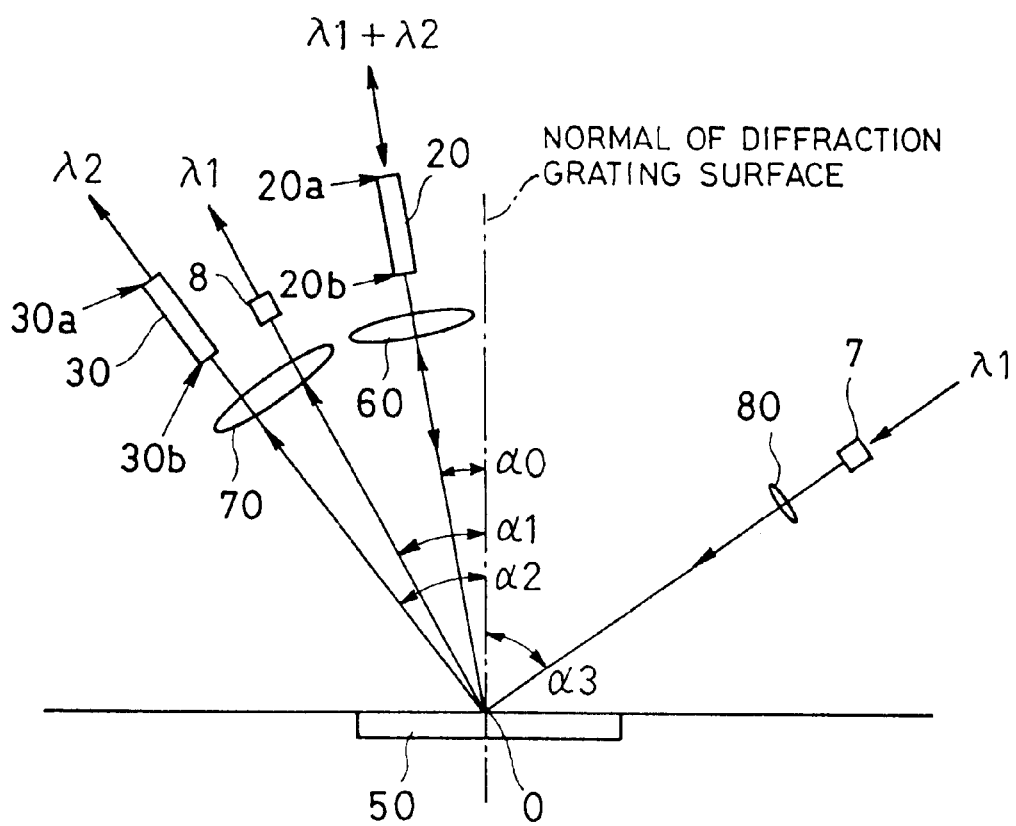
FIG. 3 is a schematic view showing the configuration of an optical transmitter and receiver module of an embodiment of the present invention.
Figure 4:
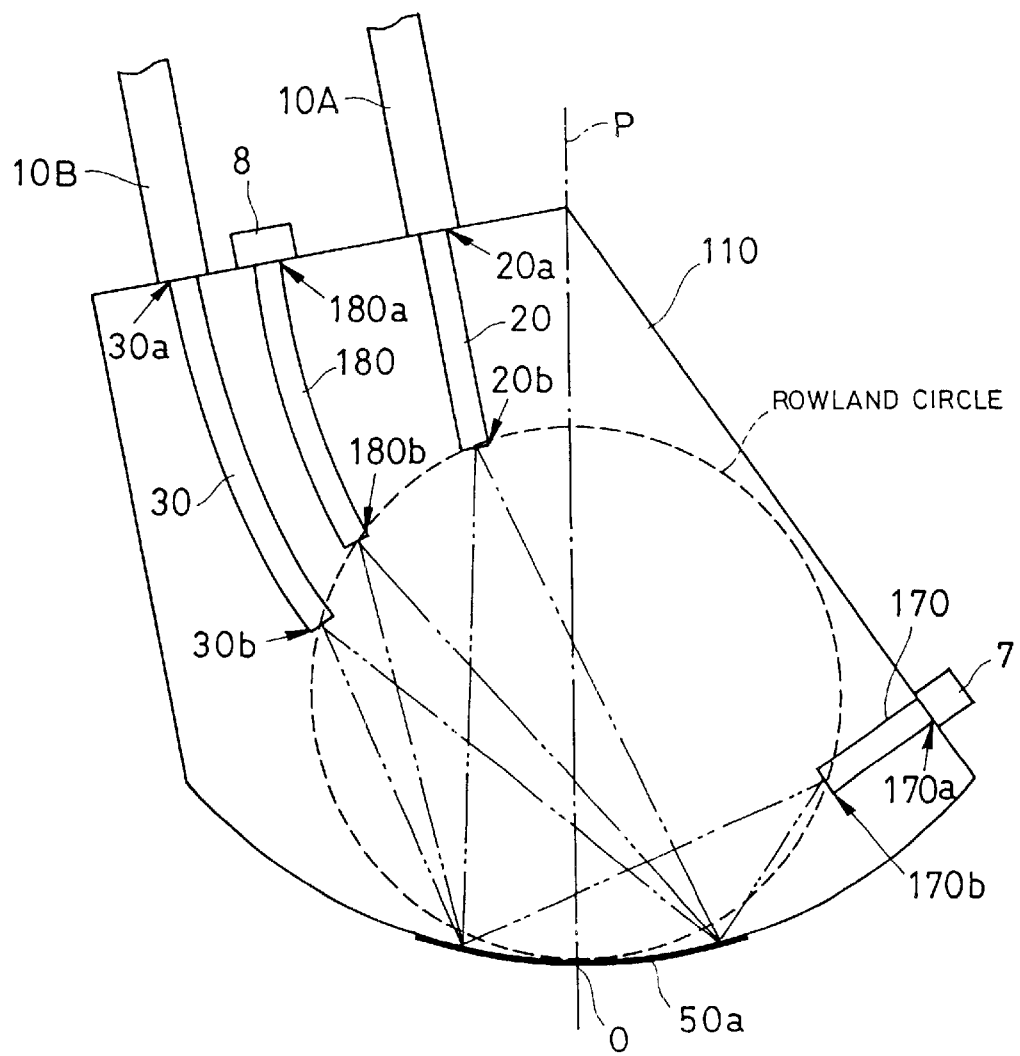
FIG. 4 is a schematic plan view of an optical transmitter and receiver module of another embodiment of the present invention.

FIG. 3 shows the outline of an optical transmitter and receiver module which employs a specific plane diffraction grating 50 with λ1 as the first wavelength band of 1.39 μm and λ2 as the second wavelength band of 1.55 μm. The figure also shows the respective relationship of angular positions α0, α1, α2, and α3, namely, of the inner end portion 20b of the common port 20 of the input/output wave-guide, the incident point of a light-receiving element photo-diode 8 of the receiver portion, the inner end portion 30b of the output port 30 of the output wave-guide, and the incident point of the transmitter laser diode 7 of the transmitter portion. There are provided corresponding collimator lenses 60, 70, and 80 on the optical paths of the dispersing/converging optical system in front of the inner end portion 20b of the common port, the photo-diode 8 of the receiver portion, the inner end portion 30b of the output port, and the laser diode 7 of the transmitter portion.

The inner end portion 20b of the common port, the photo-diode 8 of the receiver portion, the inner end portion 30b of the output port, and the laser diode 7 of the transmitter portion are disposed respectively, relative to an incidence normal, that is, the normal of the diffraction grating plane of the plane diffraction grating 50 at the point of incidence 0 on the optical path from the common port 20, at angular positions which satisfy the following equations:

$$\sin \alpha_0 + \sin \alpha_1 = m\lambda_1/\Lambda$$

$$\sin \alpha_0 + \sin \alpha_2 = m\lambda_2/\Lambda$$

$$\sin \alpha_3 + \sin \alpha_0 = m'\lambda_1/\Lambda$$

$$0 < \alpha_0 < 90$$

$$0 < \alpha_1 < 90$$

$$0 < \alpha_2 < 90$$

$$\alpha_0 \neq \alpha_1 \neq \alpha_2$$

$$-90 < \alpha_3 < 0$$

where Λ is a lattice constant of the plane diffraction grating, α0 is an incident angle of the superimposed optical signal from the inner end portion of said input/output wave-guide, α1 is a diffraction angle of the +1-order diffraction light of the optical signal of the first wavelength band to said receiver portion, α2 is a diffraction angle of the +1-order diffraction light of the optical signal of the second wavelength band to the inner end portion of said output wave-guide, α3 is an incident angle of the optical signal of the first wavelength band from said transmitter portion, and m and m' denote diffraction orders of integer with inverse signs having an absolute value.

Exemplifying an angular position of each element, α0=10°, α1=28°, α2=37°, α3=−55°, m=+1 and m'=−1 with the lattice constant Λ=2 μm at this time.

If all incident beams of the diffraction grating are designed to be incident on the diffraction grating plane in the form of S-polarized light, the light entering from the common port 20 is collimated through the lenses to be incident at the diffraction grating 50. Consequently, with high first-order diffraction efficiency and wavelength resolution of the diffraction grating 50, beams of 1.39 μm and 1.559 μm are completely decomposed in the respective direction of diffraction, and moreover, most of the incident beams are incident to the photo-diode 8 of 1.3 μm and the output port 30 of 1.55 μm. A reflection loss of the zero-order light exists but is 10% or less.

On the other hand, the light emitted from the transmitter laser diode 7 of 1.3 μm, except for the reflection loss of 10% or less, is transmitted to the common port 20 in a similar manner to the foregoing since the direction of the first-order diffraction is designed to be in the direction of the common port 20. The direction for which the transmitter laser diode 7 is disposed is originally the diffraction direction of the first-order light viewed by the light from the common port 20. However, diffraction can hardly be observed in practice in this direction due to high selectivity of the reflective diffraction grating for the first-order diffraction. Observation with an actual diffraction grating showed almost zero diffraction.

Therefore, light from the common port 20 hardly returns to the transmitter laser diode 7 of 1.3 μm. The extinction ratio of +1-order light to the −1-order light determines the isolation. Even if the angle of polarization of the incident light varied, the light is hardly diffracted but reflected in the zero-order direction due to dependency on the wavelength of the diffraction efficiency of the diffraction grating 50.

Furthermore, as a second embodiment, multiple-arrayed output port 30 of 1.55 μm allows signals of high multiplicity to be received. By using wave-guide materials such as polymers or the like which are readily processed, an integrated optical transmitter and receiver module may be constructed as shown in FIG. 3. The optical transmitter and receiver module is formed as a planar light wave circuit and there is provided, on a predetermined board, a slab wave-guide 110 in which there are provided the input/output wave-guide 20 of the common port, the output wave-guide 30 of the output port of 1.55 μm, a transmitter wave-guide 170 for connecting to the transmitter laser diode 7, and a receiver wave-guide 180 for connecting to the receiver photo-diode 8. The structure of the wave-guide may be of an optical fiber type, a ridge type, or a buried type. The transmitter wave-guide 170 has an outer end portion 170a for connecting to the transmitter laser diode 7 and an inner end portion 20b for emitting transmitter wavelengths of 1.31 μm, and the receiver wave-guide 180 has an outer end portion 180a for connecting to the receiver photo-diode 8 and an inner end portion 180b for receiving light of a receiver wavelength band of 1.31 μm. The transmitter laser diode 7, the receiver photo-diode 8, an input/output optical fiber 10A on the input side, and an output optical fiber 10B on the output side are connected to the corresponding outer end portions on the side of the board, respectively.

In the case of this integrated optical transmitter and receiver module, the reflective diffraction grating is a curved depressed diffraction grating 50a formed on the side face of the slab wave-guide of the board. The inner end portion 20b of the common port 20 of the input/output wave-guide, the incident point 180b of the light-receiving element photo-diode 8 of the receiver portion, the inner end portion 30b of the output port 30 of the output wave-guide, and the launching point 170b of the transmitter laser diode 7 of the transmitter portion are disposed on a Rowland circle inscribing the depressed diffraction grating 50a and having a curvature radius of the depressed diffraction grating 50a as the diameter. The common port 20 and the transmitter laser diode 7 are disposed so that the optical path of the launched light from each thereof locates across the line P passing through the center of the Rowland circle from a tangent point of the Rowland circle and the depressed diffraction grating 50*a*, that is, from the incident point 0. The depressed diffraction grating 50*a* can be formed by etching by means of photolithography and by coating reflection surfaces using Al etc.

The input/output optical fiber 10A on the input side and the output optical fiber 10B on the output side are fixedly inserted into a groove provided in a connector (not shown) which is fixedly adhered to the outer end portion 20*a* and 30*a* of the input/output ports so that the optical axes of the optical fibers 10A and 10B are aligned with those of the wave-guides 20 and 30. Wavelength multiplexed beams of light of a 1.3 μm and 1.55 μm band from the optical fiber 10A are launched to the common port input/output wave-guide 20. The light of the 1.55 μm band from the inner end portion 20*b* is diffracted and reflected at the depressed diffraction grating 50*a* and guided by the inner end portion 30*b* of the output wave-guide 30 to be coupled to the output single-mode optical fiber 10B at the outer end portion 30*a* of the output wave-guide for being outputted outward. The light of the 1.3 μm band is diffracted and reflected at the depressed diffraction grating 50*a* and guided from the inner end portion 180*b* to the receiver wave-guide 180 to be coupled to the photo-diode 8 at the outer end portion 180*a*. On the other hand, the light of the 1.3 μm band from the laser diode 7 is launched from the outer end portion 170*a* to the transmitter wave-guide 170. The light from the inner end portion 170*b* is diffracted and reflected at the depressed diffraction grating 50*a* and then incident on the inner end portion 20*b* of the input/output wave-guide 20 of the common port for output.

The Rowland mounting is utilized in the second embodiment above mentioned. In addition, Wadsworth mounting, Runge-Paschen mounting, or Eagle mounting may be used as well for other embodiments of the invention. Furthermore, Littrow mounting of the reflective plane gratings type may also be used. Moreover, the mountings of Czerny-Turner or Ebert spectroscope type using a depressed reflection mirror may also be used.

What is claimed is:

1. An optical transmitter and receiver module which de-multiplexes a superimposed optical signal into which at least a first and second wavelength band are superimposed, and receives and transmits an optical signal of the first wavelength band, said optical transmitter and receiver module comprising an input/output wave-guide having an outer end portion and inner end portion for inputting superimposed optical signals, a receiver portion for receiving optical signals of the first wavelength band, an output wave-guide having an outer end portion and inner end portion for outputting optical signals of the second wavelength band, a transmitter portion for transmitting the optical signals of the first wavelength band, and a dispersing/converging optical system comprising a diffraction grating which de-multiplexes optical signals of the first wavelength band and second wavelength band from said superimposed optical signal launched from the inner end portion of said input/output wave-guide, converges the optical signal of the second wavelength band to the inner end portion of said output wave-guide and converges the optical signal of the first wavelength band to said receiver portion, and also converges the optical signal of the first wavelength band, launched from said transmitter portion to the inner end portion of said input/output wave-guide.

2. An optical transmitter and receiver module according to claim 1, wherein said diffraction grating is a plane diffraction grating, and collimator lenses are disposed on optical paths in front of the inner end portion of said input/output wave-guide in said dispersing/converging optical system, said receiver portion, inner end portion of said output wave-guide and said transmitter portion, and the inner end portion of said input/output wave-guide, said receiver portion, the inner end portion of said output wave-guide, and said transmitter portion are disposed respectively, relative to an incidence normal of said plane diffraction grating at a point of incidence on the optical path of said input/output wave-guide, at angular positions which satisfy the following equations:

$\sin \alpha 0 + \sin \alpha 1 = m\lambda 1/\Lambda$ $\sin \alpha 0 + \sin \alpha 2 = m\lambda 2/\Lambda$ $\sin \alpha 3 + \sin \alpha 0 = m'\lambda 1/\Lambda$ $0 < \alpha 0 < 90$ $0 < \alpha 1 < 90$ $0 < \alpha 2 < 90$ $\alpha 0 \neq \alpha 1 \neq \alpha 2$ $-90 < \alpha 3 < 0$ where λ1 is a first wavelength band, λ2 is a second wavelength band, Λ is a lattice constant of the plane diffraction grating, α0 is an incident angle of the superimposed optical signal from the inner end portion of said input/output wave-guide, α1 is a diffraction angle of the +1-order diffraction light of the optical signal of the first wavelength band to said receiver portion, α2 is a diffraction angle of the +1-order diffraction light of the optical signal of the second wavelength band to the inner end portion of said output wave-guide, α3 is an incident angle of the optical signal of the first wavelength band from said transmitter portion, and m and m' denote diffraction orders of integer with inverse signs having an absolute value.

3. An optical transmitter and receiver module according to claim 1, wherein said diffraction grating is a depressed diffraction grating, and said optical transmitter and receiver module comprising the inner end portion of said input/output wave-guide in said dispersing/converging optical system, said receiver portion, inner end portion of said output wave-guide, and said transmitter portion, on a Rowland circle having a radius of curvature of said depressed diffraction grating as the diameter thereof, respectively.

* * * * *